United States Patent [19]

Jasinski

[11] 3,918,476
[45] Nov. 11, 1975

[54] SHEAR BLADE
[75] Inventor: Stanley C. Jasinski, Woodstock, Canada
[73] Assignee: Eaton Yale Ltd., Woodstock, Canada
[22] Filed: June 3, 1974
[21] Appl. No.: 475,472

[52] U.S. Cl. .............. 144/34 E; 83/102.1; 83/600; 83/697; 144/3 D
[51] Int. Cl.² .................. A01G 23/08; B26D 1/30
[58] Field of Search ........ 144/2 Z, 3 D, 34 R, 34 E, 144/309 AC; 83/600, 928, 693, 102.1, 697

[56] References Cited
UNITED STATES PATENTS

| | | | |
|---|---|---|---|
| 3,540,501 | 11/1970 | Jonsson | 144/34 E |
| 3,720,249 | 3/1973 | Peltonen | 144/34 E X |
| 3,831,647 | 8/1974 | Windsor | 144/34 E |
| 3,837,382 | 9/1974 | Gaitten | 144/34 E |

Primary Examiner—Harrison L. Hinson
Assistant Examiner—W. Donald Bray
Attorney, Agent, or Firm—Teagno & Toddy

[57] ABSTRACT

An improved blade assembly for a tree harvester shear. The blade assembly comprises a horizontally oriented primary blade member which is narrow relative to its length, and a plurality of vertically oriented secondary blade members or splitter bars which are welded or otherwise fastened to the underside of the primary blade. The plural splitter bars, the narrow primary blade, and the open spaces formed behind the primary blade and between the splitter bars combine to reduce friction and relieve stresses in the cut log, resulting in significantly reduced butt end damage. The above construction also serves to provide a rigid blade assembly with little tendency to climb as it moves through a tree trunk. Accordingly, shear blade damage is minimized.

5 Claims, 3 Drawing Figures

SHEAR BLADE

This invention relates to improvements in tree shears and more particularly to an improved shear blade construction.

Hydraulically actuated shears have been used successfully for cutting trees for a number of years, either as part of a tree harvesting apparatus or as part of a shearing attachment. Such shears generally comprise either a single pivotal blade acting against an anvil, or a pair of opposing, scissor-like blades.

Since their inception tree shears have proved to be quite effective and efficient with regard to speed of operation, capacity, and reliability, as compared to conventional saw felling. However, there are certain areas in which such mechanical shears still fall short of desired results.

One problem area is in the quality of the butt end of the cut log. While shears are generally capable of cutting a log quickly they tend to split and otherwise damage a portion of the log several inches above the butt end. Any such damage must be considered as waste under current systems wherein harvesters and shearing attachments are expected to produce saw logs as well as pulpwood.

Attempts to improve butt end quality have been successful to a degree. For example, in U.S. Pat. No. 3,720,249, which is assigned to the assignee of this application, there is disclosed a shear blade structure incorporating a horizontal shear blade member and a vertial splitter bar member which tends to concentrate the splitting and crushing in the stump end of the tree and produce a clean cut at the butt end of the log. While this construction has been successful when used on relatively small trees, that is up to around 12 inches in diameter, it has not been particularly successful on larger trees. It would be most desirable to be able to shear trees up to 3 feet in diameter with minimal butt end damage.

When dealing with relatively large trees another serious problem involves deflection of the shear blade as it moves through the tree. Particularly, the shear blade tends to climb as it cuts through the tree resulting in bending or breaking of the blade. Merely increasing the blade section has not proved to be a solution since it tends to increase butt end damage and the increased force required to move the blade through the tree can put unacceptable loads on other components of the machine.

Accordingly, it is an object of this invention to provide a tree shear which causes minimal butt end damage to the cut log while maintaining maximum structural integrity.

Another object of the invention is to provide a tree shear as indicated above which is effective to shear all marketable trees up to and possibly beyond 3 feet in diameter.

Another object of the invention is to provide a tree shear which minimizes the force required to cut a tree.

Another object of the invention is to provide a tree shear in which shear blade deflection is minimized.

To meet the above objectives the present invention provides a tree shear blade comprising a horizontal primary blade member and a plurality of vertical secondary blade members or splitter bars fixed beneath the primary blade. The plurality of splitter bars serve as the main structural members of the shear blade assembly, thus permitting the use of a primary blade which is very narrow as compared with prior art blades. The use of plural splitter bars combined with the narrow primary blade provides a blade which minimizes friction between the blade assembly and the tree trunk, and the open areas behind the primary blade and between the splitter bars provide an area for the wood fibers to enter as the blade cuts through. The net effect of the above features is to substantially minimize butt end damage while providing a very rigid blade structure which is not prone to bending and/or breakage due to deflection.

According to one aspect of the invention each splitter bar is curved about the pivot axis of the shear blade assembly to further assure minimal friction between the blade and the tree.

Other objects and advantages of the invention will become more apparent from the following description when taken in connection with the accompanying drawings, wherein.

Figure 1:
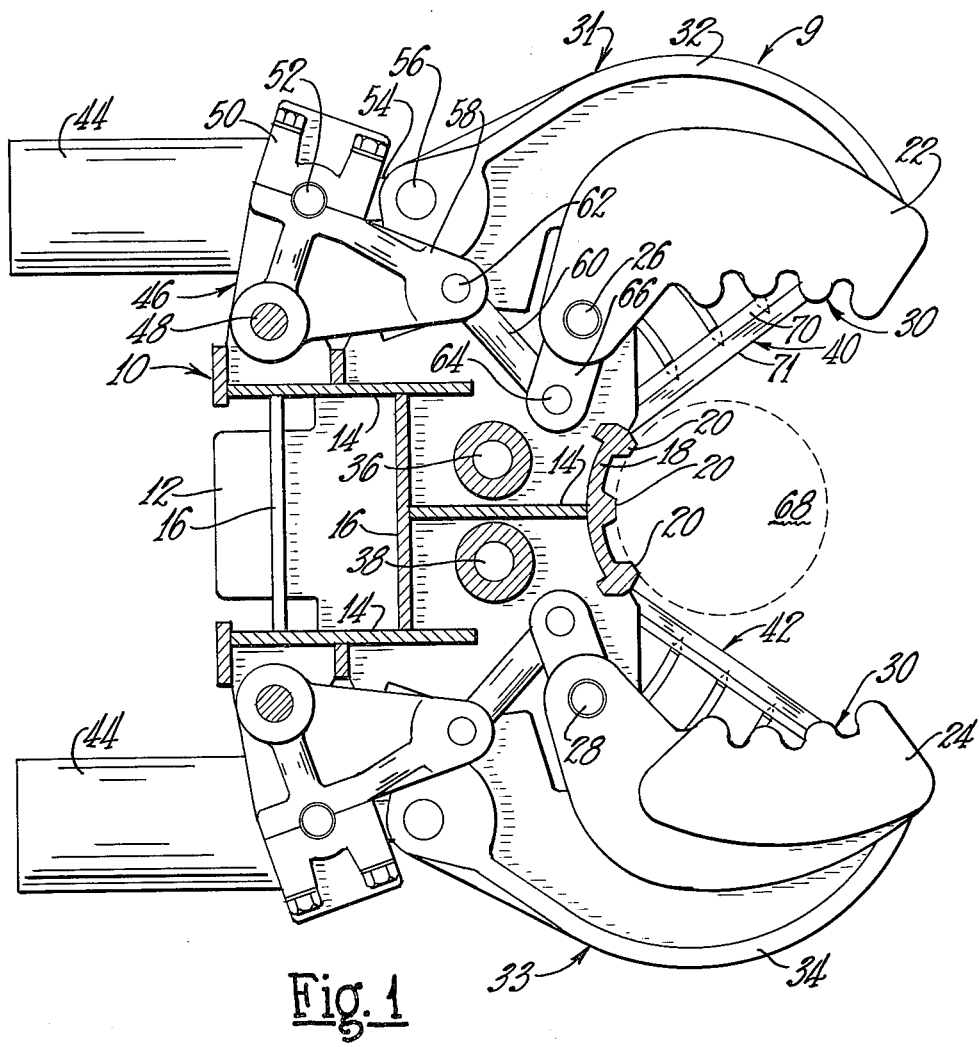
FIG. 1 is a partly sectioned plan view of a shearing head for a tree harvester incorporating shear blades constructed in accordance with the invention.

Referring to the drawings, there is illustrated a clamping and shearing head made for attachment to the felling boom of a known type of tree harvester, such as that disclosed in U.S. patent application Ser. No. 449,044, filed Mar. 7, 1974 and assigned to the assignee of this application.

The clamping and shearing head designated generally by the numeral 9 includes a main frame 10, having a bottom plate 12, a generally similar top plate (not shown) spaced thereabove, and an assembly of longitudinal plates 14 and transverse plates 16 rigidly interconnecting the two. An upright stop plate 18 curved arcuately in plan view and with vertical serrations or teeth 20 extending from its front or concave face interconnects the central front parts of the top and bottom plates of the main frame 10.

The clamp portion of the clamping and shearing head comprises a pair of fabricated clamp members 22 and 24 pivotally mounted to the frame 10 at points 26 and 28 respectively. The clamp members 22 and 24 each have an inwardly facing serrated face 30 for engaging a tree to be cut.

The shear portion of the clamping and shearing head comprises a pair of oppositely arranged but similar shear assemblies 31 and 33 pivotally mounted to the underside of bottom plate 12 at points 36 and 38 respectively. The shear assemblies 31 and 33 comprise frame members 32 and 34 and shear blade assemblies 40 and 42, which will be described in more detail, bolted or otherwise fastened to the frame members.

The actuators and linkage by which the clamp members 22 and 24 and the shears 31 and 33 are closed abut a tree form no part of the present invention and will be described only as necessary for a basic understanding of the shear mechanism. Briefly, a single hydraulic cylinder 44 on either side of the felling head actuates both the clamp arm and shear assembly on its side of the head by means of a bellcrank member 46. Accordingly, only one side is described herein. The bellcrank 46 is pivotally mounted to the frame 10 at 48. An outwardly extending arm 50 of the bellcrank forms a trunnion mount for the cylinder 44, with the cylinder pivoted at trunnion 52. The piston rod 54 (see FIG. 2) of the cylinder 44 is pivotally attached to the shear frame 32 at 56. A forwardly extending arm 58 of the bellcrank 46 is connected to the clamp arm 22 through a connecting rod 60. The connecting rod 60 has one end pivotally connected to the arm 58 at 62 and the other end pivotally connected at 64 to an actuating lever 66 which is an integral part of the clamp member 22.

In operation, when the piston rod 54 is extended the shear assembly 31 is rotated clockwise about 36 to bring the shear blade assembly 40 into contact with a tree 68. As the shear blade contacts the tree the reaction on the cylinder 44, acting through the trunnion 52, causes the bellcrank 46 to rotate counterclockwise about pivot point 48, thus in turn through the connecting rod 60 causing the clamp member 22 to rotate clockwise about 26 to move the serrated face 30 into clamping engagement with the tree 68.

It can be appreciated that the two cylinders 44 are operated in unison and that clamp member 24 and shear assembly 33 are actuated in a similar manner.

Figure 2:
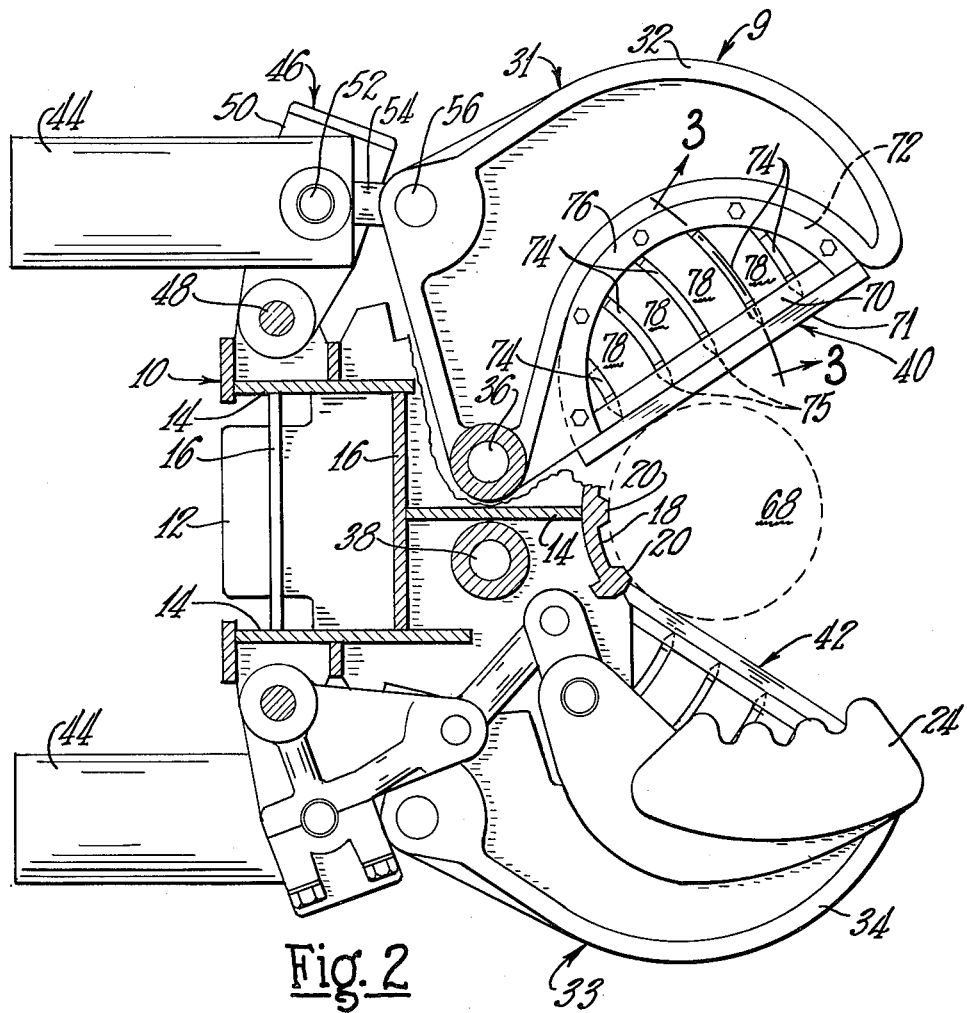
FIG. 2 is a view similar to FIG. 1 with parts removed and cut away to show details of the shear blade structure.
Figure 3:
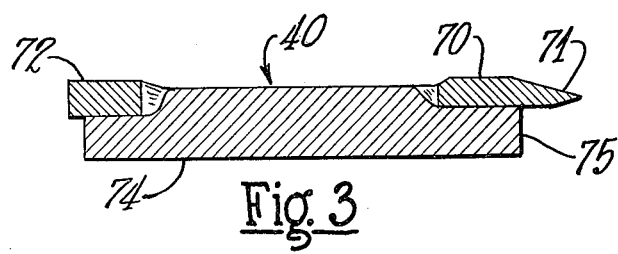
FIG. 3 is a section view taken along line 3—3 of FIG. 2.

Referring particularly to FIGS. 2 and 3, the shear blade assemblies 40 and 42 are essentially mirror images of one another and only one will be described in detail. The shear blade assembly 40 comprises a primary blade member 70 having a cutting edge 71 formed thereon; a semicircular, annularly extending mounting ring or flange 72, which is generally in the same plane as the primary blade 70 and is welded or otherwise fastened at either end to the primary blade; and a plurality of secondary blade members or splitter bars 74, each having a cutting edge 75, which are welded or otherwise fastened at one end to the mounting ring 72 and at the other end to the primary blade 70, as shown in FIG. 3. As illustrated, the cutting edge portion 75 of each splitter bar is located somewhat behind the cutting edge portion 71 of the primary blade member. The mounting ring 72 is bolted to the underside of a semicircular mounting flange portion 76 of the shear frame 32.

In the illustrated embodiment five splitter bars 74 are equally spaced along the primary blade 70 between the ends of the mounting ring 72. The number of splitter bars and their spacing is not critical; however, by using the multiple splitter bars to provide rigidity to the relatively thin primary blade 70 a plurality of open spaces 78 are provided behind the primary blade. It has been found that as the primary blade 70 and splitter bars 74 move through a tree the wood fibers displaced by the blades tend to move into these open areas. The net result is that the overall friction force acting on the blade assembly is reduced as compared with a solid shear blade structure; and damage to the wood, particularly at the butt end of the cut log, is minimized.

Another important factor is the rigidity of the blade structure. While it is desirable to have the open areas 78 as large as possible it can be appreciated that a balance must be struck between the open areas and the number and size of the splitter bars in order to provide both reduced butt end damage and a rigid shear assembly.

In order to further relieve the friction of the blade assembly, according to one aspect of the invention each of the splitter bars 74 is curved about the pivot point 36 of the shear frame 32, thus minimizing displacement of the wood fibers as the splitter bars move through the tree.

The actual shape of the blade assembly in plan view is not critical. The semi-circular shape of the illustrated embodiment is primarily a matter of adapting the new design to existing harvesting equipment. The blade assembly can be any convenient shape compatible with the important factors discussed above.

In operation, the shearing head 9 is moved into position to cut a tree as close to ground level as possible and with the tree positioned against the serrations 20 of the upright stop plate 18. When hydraulic pressure is applied to the cylinder 44 the shear assembly 31 moves first, pivoting about point 36 until the cutting edge 71 of the primary blade member 70 contacts the tree 68. As soon as the resistance of the tree is met the reaction on the bellcrank 46 acting through the cylinder trunnion 52 causes the clamp member 22 to close about the tree. It can be appreciated that the other clamp member 24 and shear assembly 31 operate in exactly the same manner such that as additional hydraulic pressure is applied to the cylinders 44 the shear blade assemblies 40 and 42 move through the tree in scissor-like fashion until it is completely severed.

As the blade assemblies move through the tree the splitter bars 74 tend to crush the fibers on the stump side of the blade assemblies. This has the effect of relieving stresses in the butt end of the log and tends to minimize damage to the butt end. Also, the wood fibers displaced by the primary blades and by the splitter bars tend to move into the open spaces 78 behind the primary blades and between the splitter bars, further relieving stresses in the butt end of the cut log and reducing overall blade friction, thus producing a clean cut at the butt end. The single, narrow primary blade and multiple splitter bar construction provides a rigid blade structure which has very little tendency to climb as it cuts through the tree.

Although the invention has been described as it is applied to a scissor type shear assembly it can be expected that the invention would produce equally beneficial results if applied to the type of shear assembly in which a single blade assembly acts against an anvil.

I claim:

1. In a tree shear including at least one shear blade assembly and means for moving said shear blade assembly into shearing engagement with a standing tree to be cut: a blade structure comprising a horizontally oriented primary blade member; a plurality of secondary vertically oriented blade members fixed at one end to and spaced apart along the underside of said primary blade member; and a mounting flange fixed to the opposite ends of said secondary blade members for attaching said blade structure to said shear blade assembly; said primary blade member, said secondary blade members and said mounting flange being arranged to provide a plurality of open spaces disposed between said primary blade member and said mounting flange and separated by said secondary blade members.

2. Apparatus as claimed in claim 1, in which the combined area of said open spaces is substantially larger than the area of said primary blade member in the cutting plane of said blade assembly.

3. Apparatus as claimed in claim 1, including pivotal mounting means operatively attached to said mounting flange for movement of said shear blade assembly about a vertical axis into engagement with a tree; each of said secondary blade members being curved about said axis.

4. Apparatus as claimed in claim 1, in which said mounting flange comprises a substantially semi-annular member having its ends fixed to said primary blade member, said secondary blade members being substantially evenly distributed across the semicircular opening formed between said mounting flange and said primary blade member.

5. Apparatus as claimed in claim 1, in which said primary blade member has a horizontal cutting edge formed thereon, and said secondary blade member has a vertical cutting edge thereon, said secondary blade member being fixed to said primary blade member with its cutting edge behind the cutting edge of said primary blade member.

* * * * *